United States Patent
Kuroda et al.

(10) Patent No.: US 7,514,837 B2
(45) Date of Patent: Apr. 7, 2009

(54) BRUSHLESS ALTERNATOR

(75) Inventors: Motokazu Kuroda, Tokyo (JP); Kyoko Higashino, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 493 days.

(21) Appl. No.: 11/340,514

(22) Filed: Jan. 27, 2006

(65) Prior Publication Data
US 2007/0018531 A1    Jan. 25, 2007

(30) Foreign Application Priority Data
Jul. 25, 2005   (JP) .................... P.2005-214154

(51) Int. Cl.
*H02K 29/00* (2006.01)
(52) U.S. Cl. ...................... 310/263; 310/194
(58) Field of Classification Search ................ 310/263, 310/194, 191
See application file for complete search history.

(56) References Cited

U.S. PATENT DOCUMENTS 6,384,506 B1 * 5/2002 Kojima et al. ............. 310/194
6,967,423 B2 * 11/2005 Kuroda et al. ............. 310/194

FOREIGN PATENT DOCUMENTS

| JP | 53-54313 | 5/1978 |
| JP | 11-55922 A | 2/1999 |
| JP | 2001-128397 A | 5/2001 |
| JP | 2005-80440 A | 3/2005 |
| JP | 2005-94860 A | 4/2005 |

OTHER PUBLICATIONS

Japanese Office Action dated Jan. 15, 2008.

* cited by examiner

*Primary Examiner*—Dang D Le
(74) *Attorney, Agent, or Firm*—Sughrue Mion, PLLC

(57) ABSTRACT

A brushless alternator includes: a rotor mounted on a shaft; a ring-shaped yoke which is opposed to the rotor via a very narrow radial clearance; a stepped portion provided on a side surface of an inner circumference of an axial end section of the yoke; a plate fixed to the stepped portion and having a cylindrical portion made of a magnetic material; a bobbin provided so as to surround a radially outer side of the cylindrical portion of the plate for the purpose of winding a field coil therearound; and a stator provided with a clearance retained on an outer side of the rotor, wherein a radial thickness of a part of the cylindrical portion which is fixed to the stepped portion provided on the inner circumferential surface of the yoke is set larger than 1 mm and not larger than 2 mm.

11 Claims, 7 Drawing Sheets

BRUSHLESS ALTERNATOR

BACKGROUND OF THE INVENTION

1. Field of the Invention

This invention relates to a brushless alternator, and more particularly to the shape of a plate constituting a bobbin, and a joint structure of the plate and a yoke.

2. Description of the Related Art

A related art brushless alternator has a bobbin for a field coil, and a cylindrical portion of a plate is fitted around a stepped portion of a yoke constituting the bobbin so that one end of the cylindrical portion closely contacts the stepped portion. (Refer to, for example, JP-A-2005-80440)

The brushless alternator disclosed in JP-A-2005-80440 merely shows that the size of a radial height-reduced section of the stepped portion is slightly larger than the thickness of the cylindrical portion of the plate in the radial direction thereof. In this portion, a flow of a magnetic flux was not smooth, and the efficiency of a magnetic circuit could not be improved.

SUMMARY OF THE INVENTION

The present invention has been made for the purpose of solving these problems, and aims at providing a brushless alternator in which an output current has been improved owing to an optimized magnetic circuit formed.

The brushless alternator according to the present invention includes a stepped portion provided on a side surface of an inner circumferential surface of an axial end portion of a yoke, a plate having a cylindrical section fixed to the stepped portion and made of a magnetic material, a bobbin provided so as to surround a radially outer side of the cylindrical section of the plate for the purpose of winding a field coil therearound, and a stator provided on an outer side of the rotor with a clearance retained therebetween, to which stator a magnetic flux generated by the field coil propagates, a radial thickness of the part of the cylindrical portion of the plate which is fixed to the stepped portion provided on the inner circumferential surface of the yoke is set larger than 1 mm and not larger than 2 mm.

Since the radial thickness of the cylindrical portion of the plate is optimized by taking the improvement of the smoothness of a flow of the magnetic flux into consideration, an output from the brushless alternator is improved. Moreover, an increase in the temperature of the field coil is restrained.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Embodiment 1

Figure 1:
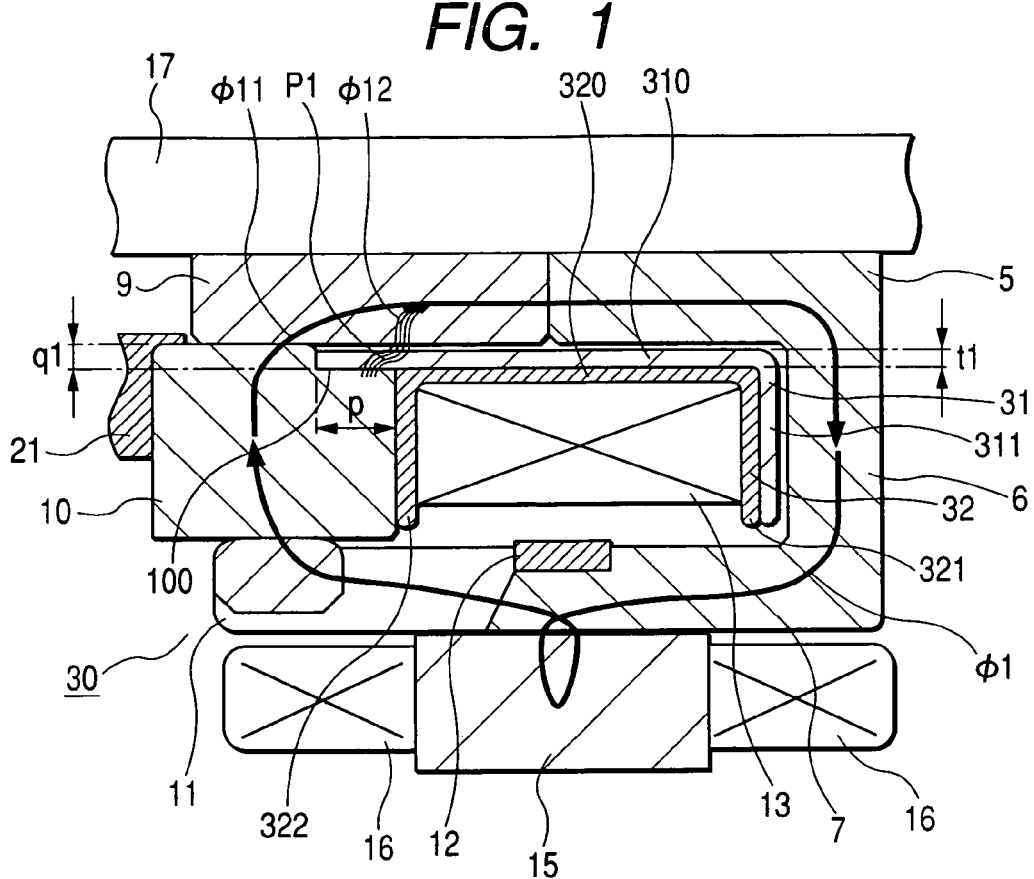
FIG. 1 is an axial sectional view of the bobbin for the field coil provided in the brushless alternator in one embodiment of the present invention.
Figure 2:
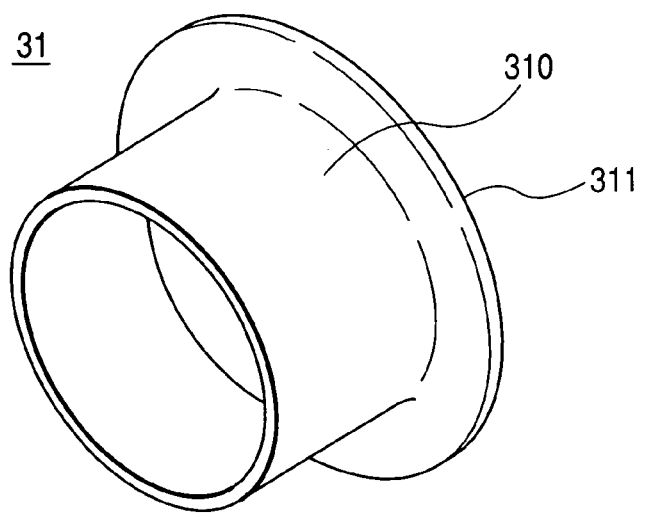
FIG. 2 is a perspective view of the plate applied to the bobbin shown in FIG. 1.
Figure 3:
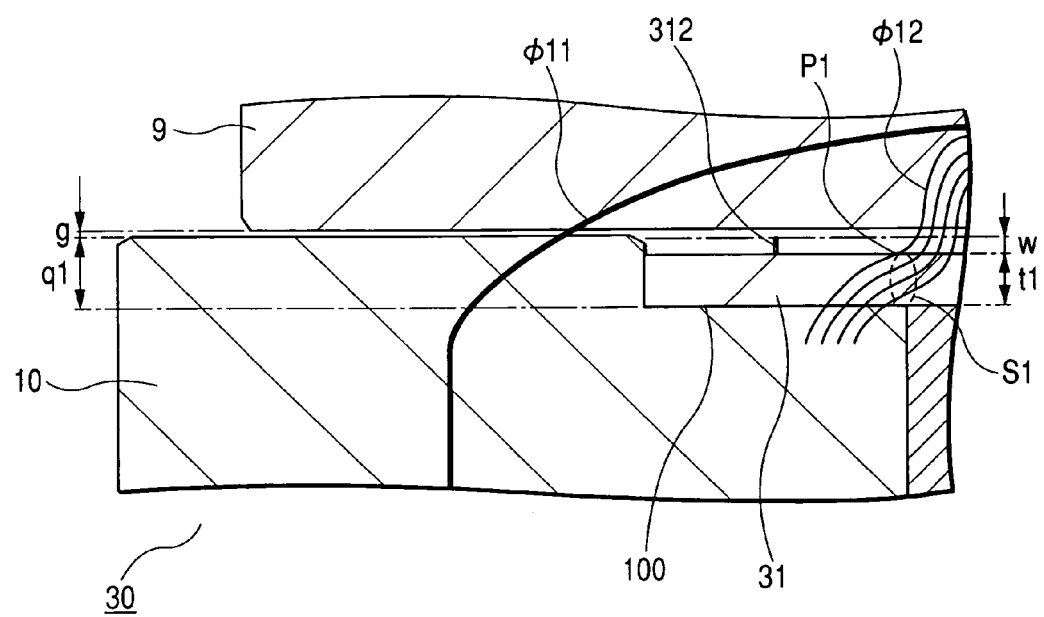
FIG. 3 is an enlarged axial sectional view of a principal portion of the bobbin shown in FIG. 1.
Figure 4:
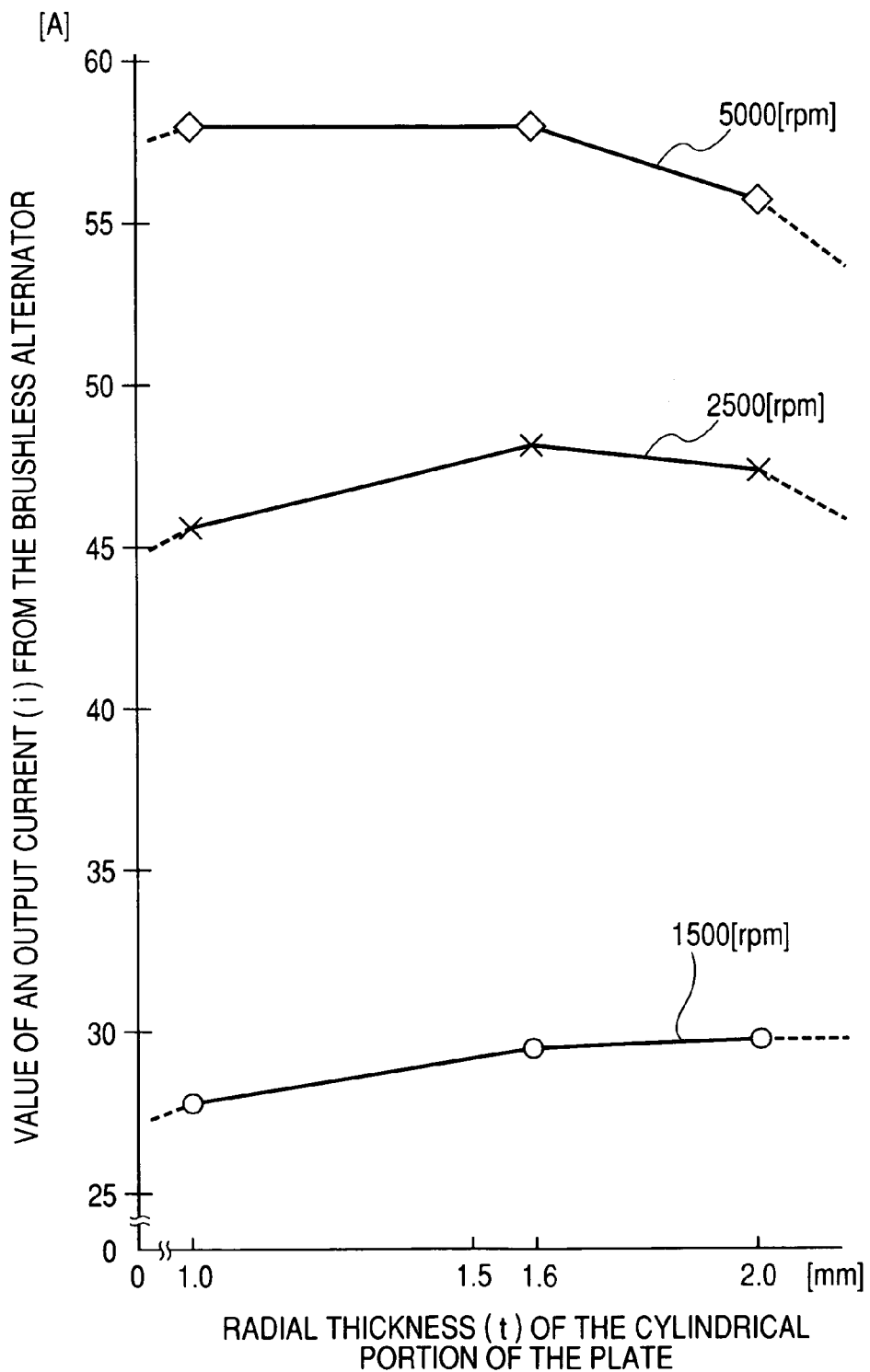
FIG. 4 is a graph showing the value of output current from the bruchless alternator with the radial thickness of the plate varied in the embodiment of the present invention.
Figure 5:
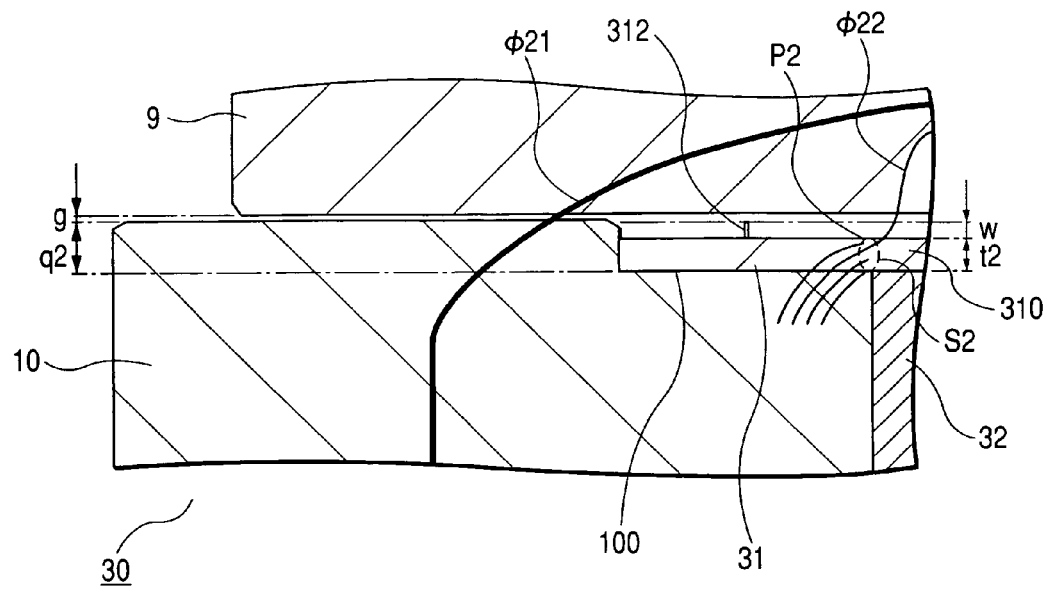
FIG. 5 is an enlarged axial sectional view of a principal portion of the bobbin shown in FIG. 1.
Figure 10:
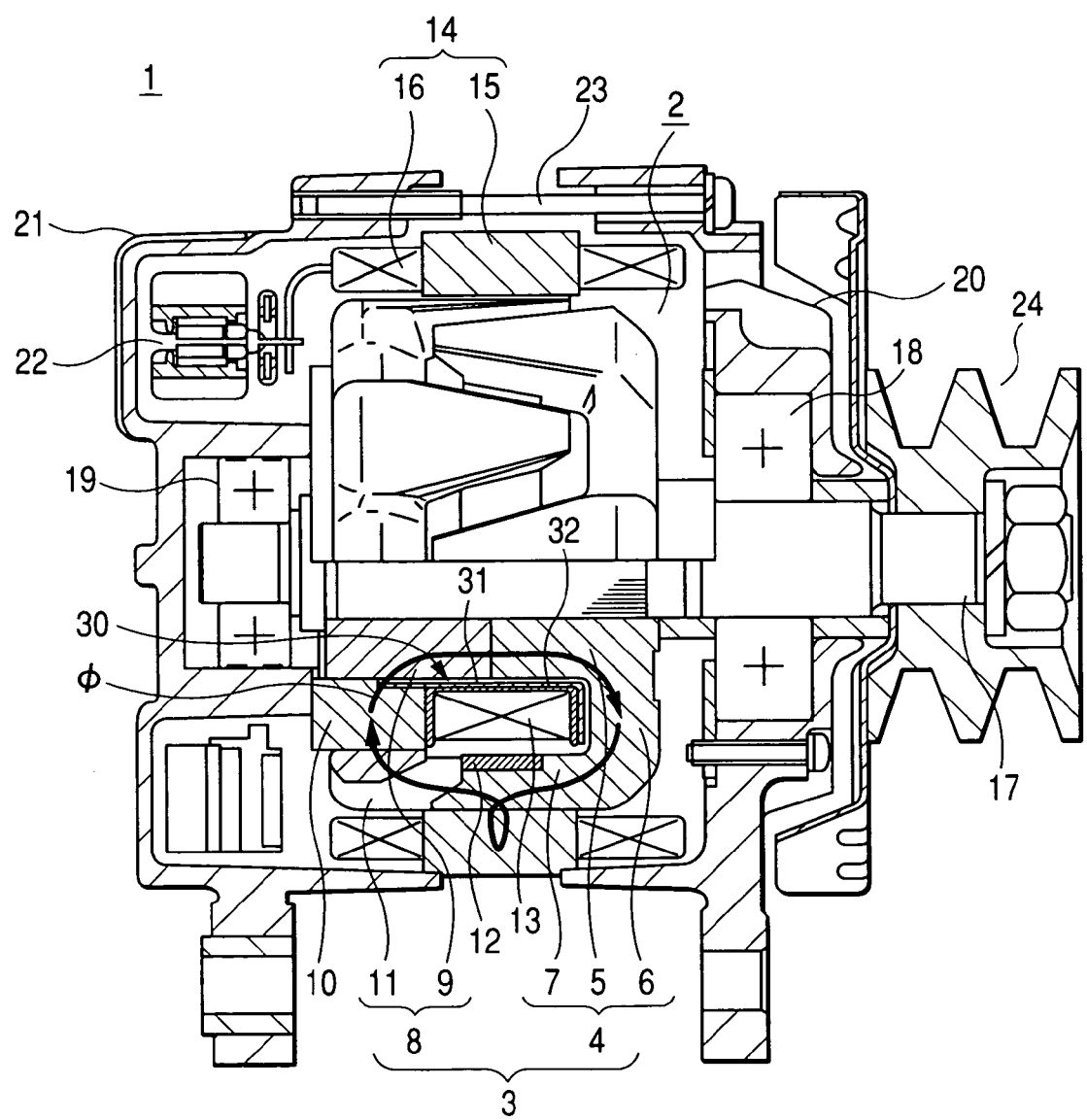
FIG. 10 is an axial sectional view of the brushless alternator having the bobbin for the field coil shown in FIG. 1.

FIG. 1 is an axial sectional view of a bobbin for a field coil which the brushless alternator in the embodiment of the present invention is provided. FIG. 2 is a perspective view of a plate applied to the bobbin. FIG. 3 is an enlarged axial sectional view of a principal portion of the bobbin. FIG. 4 is a graph indicating an output current value of the brushless alternator in a case where the radial thickness of the plate is varied. FIG. 5 is an enlarged axial sectional view of a principal portion of the bobbin. FIG. 10 is an axial sectional view of the brushless alternator having the bobbin for the field coil shown in FIG. 1.

First, the construction of the brushless alternator in the embodiment of the present invention will be described.

Referring to FIG. 10, a rotor 2 is mounted on a shaft 17, and has a magnetic flux transmitting magnetic pole iron core 3, which is made of a first magnetic pole iron core 4 and a second magnetic pole iron core 8. A first boss 5 constituting the first magnetic pole iron core 4 is provided at an axial portion thereof with an insert hole (not shown) for inserting the shaft 17 therethrough. A first ring-shaped yoke 6 is extended from one end of the boss 5, and a first claw-shaped magnetic pole 7 is extended from an outer circumference of the yoke 6 toward the other axial side thereof. The shaft 17 is press fitted in the through hole (not shown) provided in an axial portion of the first magnetic pole iron core 4 so that the shaft 17 is relatively non-rotatable.

A second boss 9 constituting a second magnetic pole iron core 8 is provided at an axial portion thereof with a through hole (not shown) for inserting the shaft 17 therethrough in the same manner as the first magnetic pole iron core 4. A second yoke 10 fixed to a second bracket 21 and having a shape of a ring is provided on the radially outer side of the second boss 9 via a very narrow clearance. A field coil 13 is fixed to an axial end portion of the second yoke 10 via a plate 31 and a bobbin 32. A second claw-shaped magnetic pole 11 is provided on the radially outer side of the second yoke 10 via a very narrow clearance. The second claw-shaped magnetic pole 11 is fixed to the first claw-shaped magnetic pole 7 via a ring 12, which is provided on the radially inner circumferential side of the first claw type magnetic pole 7 and made of a nonmagnetic material, in such a manner that the second claw-shaped magnetic pole 11 is meshed with the first claw-shaped magnetic pole 7.

The shaft 17 is press-fitted in the insert hole (not shown) provided in an axial portion of the second magnetic pole iron core 8 so that the shaft 17 is fixed relatively non-rotatably with the axial end surface of the second boss 9 abutted on the other axial end surface of the first boss 5.

The stator 14 has a stator core 15, around which a stator winding 16 is provided, and is arranged so as to surround an outer circumference of the rotor 2.

The first bracket 20 and second bracket 21 hold the stator core 15 between shoulder portions of the stator core at both of axial end portions thereof by a through bolt 23. The first bracket 20 supports one end portion of the shaft 17 rotatably via a first bearing 18, while the second bracket 21 supports the other end portion of the shaft 17 rotatably via a second bearing 19. Owing to this structure, the rotor 2 is provided rotatably on the inner sides of the first bracket 20 and second bracket 21. A pulley 24 is fixed to one end portion of the shaft 17 which extends from the first bracket 20 in the outward direction, and driven by an engine (not shown).

In the brushless alternator 1 thus formed, a current is supplied from a battery (not shown) to the field coil 13 to generate a magnetic flux $\phi$ around the field coil 13. This magnetic flux $\phi$ is transmitted from the second yoke 10 to the second boss 9 through the very narrow clearance retained on the radially inner side, then crosses the stator 14, which is provided on the radially outer side of the rotor 2, through the first boss 5, the end surface of which is abutted on the second boss 9, first yoke 6 and first claw-shaped magnetic pole 7, the magnetic flux $\phi$ then flowing through the second claw-shaped magnetic pole 11 and very narrow clearance on the radiallly inner side thereof to finally return to the second yoke 10, the magnetic flux being thereby flowing such a path. This causes the first claw-shaped magnetic pole 7 is magnetized into a N-pole, and the second claw-shaped magnetic pole 11 into a S-pole.

The pulley 24 is driven by the engine to rotate the shaft 17 connected directly to the pulley 24, so that the rotor 2 is thereby rotated. The rotation of the rotor 2 causes the magnetic field made by the field coil 13 to be also rotated, and the magnetic flux $\phi$ forming the rotating magnetic field is given to the stator core 15 through the above-mentioned path, so that an AC electromotive force occurs in the stator winding 16. An AC current occurring in the stator winding 16 owing to this AC electromotive force is rectified into a DC current in a rectifier 22, so that the battery (not shown) is charged.

Since the field coil 13 is provided on the second yoke 10 fixed to the second bracket 21, the field coil 13 is not rotated during this time but the first magnetic pole iron core 4 including the first boss 5, first yoke 6 and first claw-shaped magnetic pole 7 which are formed so as to be integral, and the second boss 9 and second claw-shaped magnetic pole 11 of the second magnetic pole iron core 8 are rotated.

As shown in FIG. 1, the bobbin 30 includes a second yoke 10 fixed to the second bracket 21, a plate 31 fixed to the second yoke 10 by spot welding, and a bobbin 32 which is provided in a space defined by the second yoke 10 and plate 31, and which is wound with a field coil 13. The second yoke 10 has a rectangular cross section, and is formed in the shape of a ring. Since a cylindrical portion 310 of the plate 31 is fixed with a high strength to the second yoke 10, a stepped portion 100 enlarges the diameter of an inner circumference of the second yoke from one end over an axial length p, and is annularly formed.

As shown in FIG. 2, the plate 31 is formed by pressure-molding a soft steel plate, and provided with a cylindrical portion 310, and a disc-shaped flange 311 extending from one axial end of the cylindrical portion 310 to a position in the radially outward direction. The bobbin 32 is formed out of a nylon resin, and has a cylindrical portion 320 for being fitted in a radially inner portion of the cylindrical portion 31. A first disc-shaped extension 321 and a second disc-shaped extension 322 are provided which extend from both ends of the cylindrical portion 320 toward positions in the radially outward direction.

The dimensional relation between each of the members constituting the bobbin 30 will now be described.

The outer diameter of the cylindrical portion 310 of the plate 31 is substantially equal to the inner diameter of the stepped portion 100 of the second yoke 10, and the outer diameter of the flange 311 is substantially equal to that of the second yoke 10. The inner diameter of the cylindrical portion of the bobbin 32 is substantially equal to the outer diameter of the cylindrical portion 310 of the plate 31, and the axial length of the bobbin 32 is substantially equal to the length obtained by subtracting the axial length (p) of the stepped portion 100 from that of the cylindrical portion 310 of the plate 31. The radial length of each of the first extension 321 and second extension 322 of the bobbin 32 is substantially equal to that of the flange 311 of the plate 31.

The magnetic flux $\phi1$ occurring around the field coil 13 is divided into a first magnetic flux component $\phi11$ flowing to the second boss 9 through the very narrow clearance retained on a radially innermost surface of the second yoke 10, and a second magnetic flux component $\phi12$ flowing to the second boss 9 through very narrow clearance retained above a radially innermost surface of the cylindrical portion 310 of the plate 31, after the magnetic flux flows in the cylindrical portion 310 of the plate 31 fixed to the second yoke 10.

As shown in FIG. 3, the size q1 of a radial recess of the stepped portion 100 represents a distance between the radially innermost surface of the second yoke 10 and the radially outermost surface of the stepped portion. The bobbin is formed to a small diameter so that a difference w between the size q1 of the recess and the radial thickness t1 of the cylindrical portion 310 of the plate 31 becomes not smaller than 0.4 mm. Owing to this structure, even when welding impression 312 occurs during the fixing of the plate 31 to the stepped portion 100 by spot welding, the welding impression 312 does not project from the inner circumference of the second yoke 10 toward a radially inner side thereof, so that the rotational action of the rotor 2 is not adversely affected thereby.

The width of the very narrow clearance g retained above the radially innermost surface is set to 0.25 mm, which is smaller than the width of the very narrow clearance through which the second magnetic flux component $\phi12$ flows, so that the quantity of magnetic flux flowing through the first magnetic flux component $\phi11$ is larger than that of magnetic flux flowing through $\phi12$.

FIG. 4 is a graph showing the relation between the radial thickness of the cylindrical portion of the plate and an output current i from the brushless alternator 1 in cases where the rotational frequency of the rotor 2 of the brushless alternator is set to a low level (1500 rotations per minute), an intermediate level (2500 rotations per minute) and a high level (5000 rotations per minute) with the radial thickness t of the cylindrical portion of the plate increased from 1 mm to 2 mm. The graph shows the thickness t on the lateral axis, and output current value i on the longitudinal axis.

First, a case where the thickness t is within the range of t2 (t2 is not larger than 1.0 mm) will be described. The bobbin 30 with the size t set to 1 mm is shown in FIG. 5.

In this bobbin, a radial cross section S2 of a portion P2 in which the second magnetic flux component $\phi22$ flows in the cylindrical portion 310 becomes very narrow. The choking of the magnetic flux passing through the radial cross section S2 occurs without depending upon the rotational frequency mentioned above, and the quantity of the second magnetic flux component $\phi22$ decreases. As a result, a total quantity of the magnetic flux $\phi2$ (not shown) decreases, so that the value of the output current i also decreases.

A case where the thickness t is in the range of t1 (t1 is larger than 1.0 mm and not larger than 1.6 mm) will then be described. A bobbin 30 in which the mentioned thickness t is 1.6 mm is shown in FIG. 3. In this bobbin, the radial sectional area S1 of a portion P1 in which the second magnetic flux φ12 flows axially in the cylindrical portion 310 increases, and, therefore, the choking of the magnetic flux in the portion P1 is prevented. Consequently, the quantity of flux of the second magnetic flux component φ12 increases, and a total quantity φ1 of magnetic flux also increases accordingly, so that the value of the output current i increases. Moreover, since the thickness t is increased, the heat occurring in the field coil 13 is diffused from the cylindrical portion 310 of the plate 31 to the bracket via the second yoke 10, so that an increase in the heat of the field coil 13 can be held down.

A case where the radial thickness t of the cylindrical portion 310 of the plate 31 is within the range of t3 (t3 is larger than 1.6 mm and not larger than 2 mm) will then be described. In this example, the construction of the bobbin 30 will not be shown.

In this example, the thickness t increases, so that the inner diameter of the field coil 13 becomes large to cause the length of the coil constituting the field coil to increase. Therefore, the resistance value of the field coil increases and the value of the field current flowing in the field coil decreases, so that the value of the output current i decreases.

When the rotational frequency is low, the output current value recorded in the case where the quantity of the magnetic flux increased owing to the increase in the thickness t and the output current value recorded in the case where the field current value decreased due to the increased resistance value of the field coil 13 are offset each other. Therefore, a variation is not seen between the value of the output current i recorded in the case where the thickness t is 1.6 mm and similar value recorded in the case where the thickness t is 2 mm.

A case where the radial thickness t of the cylindrical portion 310 of the plate 31 is in the range of t4 (t4 is larger than 2 mm) will then be described. In this example, the construction of the bobbin 30 will not be shown.

In this example, the thickness t increased, so that the inner diameter of the field coil 13 becomes large with the length of the coil constituting the field coil further increasing. Therefore, the resistance value of the field coil increases, so that the value of the field current flowing in the field coil decreases. This causes the value of the output current i to decrease.

As shown in FIG. 4, when the bobbin formed so that the thickness t is larger than 1.0 mm and not larger than 2.0 mm is used, it becomes possible to improve the value of the output current i in the brushless alternator having a low rotational frequency (1500 rotations per minute). Furthermore, when the thickness t is set to 1.6, brushless alternators can be provided which have an improved value of the output current i in cases where the rotational frequency is not only low but also intermediate (2500 rotations per minute) and high (5000 rotations per minute).

Embodiment 2

In this embodiment, a brushless alternator in which a yoke and cylindrical portion are fixed to each other by using a bonding agent will be described as an example of the brushless alternator according to the present invention.

Figure 6:
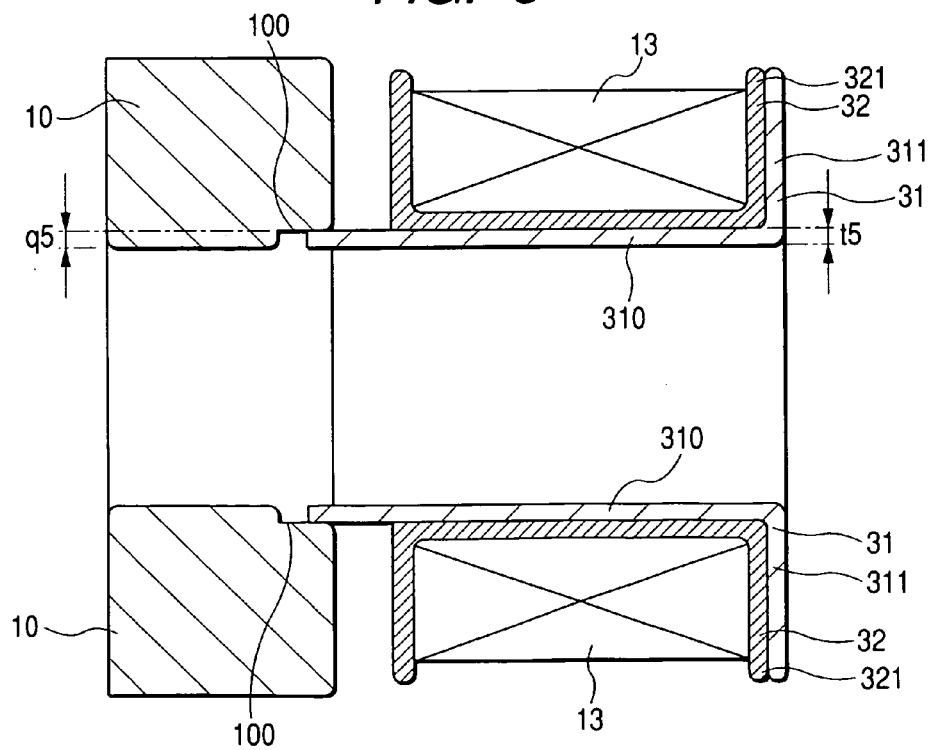
FIG. 6 is an axial sectional view of the bobbin provided in one embodiment of the present invention.

FIG. 6 is an axial sectional view of a bobbin for a brushless alternator in the embodiment 2 of the present invention. Referring to the drawing, the parts identical with those of the embodiment 1 will be designated by the same reference numerals, and a description thereof will be omitted.

As shown in FIG. 6, when a bonding agent is applied to a radially inner circumferential surface of a stepped portion 100 provided on a ring type second yoke 10, and one end portion of a cylindrical portion 310 of a plate 31 is press-fitted into the stepped portion 100. This enables the second yoke 10 and plate 31 to be fixed together. Moreover, the size q5 of a recess and the radial thickness t5 of the cylindrical portion 310 of the plate become equal, and the length of a field coil 13 decreases. A resistance value of the field coil 13 decreases, and the value of a field current increases, the value of an output current i increasing. Therefore, the construction of a compact brushless alternator having priority to the output performance can be obtained.

Embodiment 3

In this embodiment, a brushless alternator in which a yoke and a cylindrical portion are screwed to each other will be described as an example of the brushless alternator according to the present invention.

Figure 7:
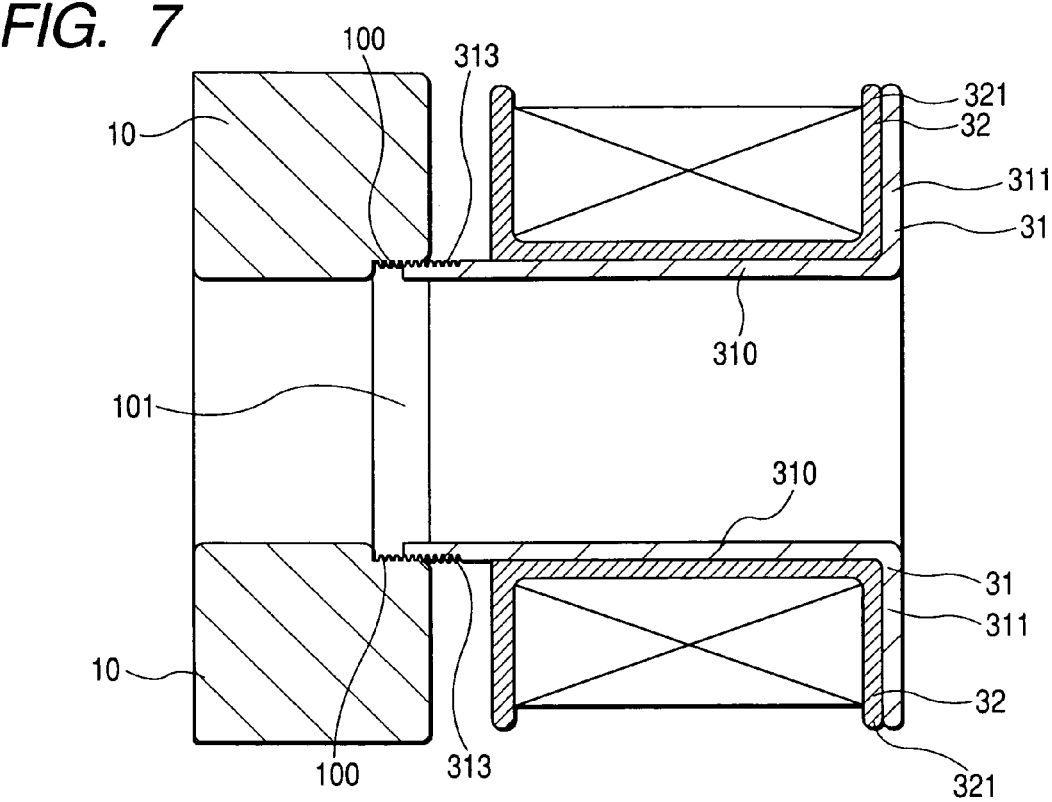
FIG. 7 is an axial sectional view of the bobbin provided in one embodiment of the present invention.

FIG. 7 is an axial sectional view of a bobbin for a field coil in the brushless alternator in the embodiment 3 of the present invention. Referring to the drawing, the parts identical with those of the embodiment 1 or 2 will be designated by the same reference numerals, and a description thereof will be omitted.

As shown in FIG. 7, a radially inner circumferential surface of a stepped portion 100 and a radially outer circumferential surface of a cylindrical portion 310 of a plate 31 are threaded. A female thread 101 is formed on the radially inner circumferential surface of the stepped portion 100, and a male thread 313 on the radially outer circumferential surface of the cylindrical portion 310. When these threads are engaged with each other, the fixing of a second yoke 10 and plate 31 together can be done. Owing to this structure, the effect identical with that of the embodiment 2 can be obtained, and the stepped portion 100 and plate 31 can be fixed together firmly.

A structure in which the fixing strength is further improved by applying a bonding agent to the radially inner circumferential surface of the stepped portion 100, and then fixing the second yoke 10 and plate 31 to each other.

Embodiment 4

In this embodiment, a brushless alternator not using a bobbin made of a nylon resin in advance will be described as an example of the brushless alternator according to the present invention.

Figure 8:
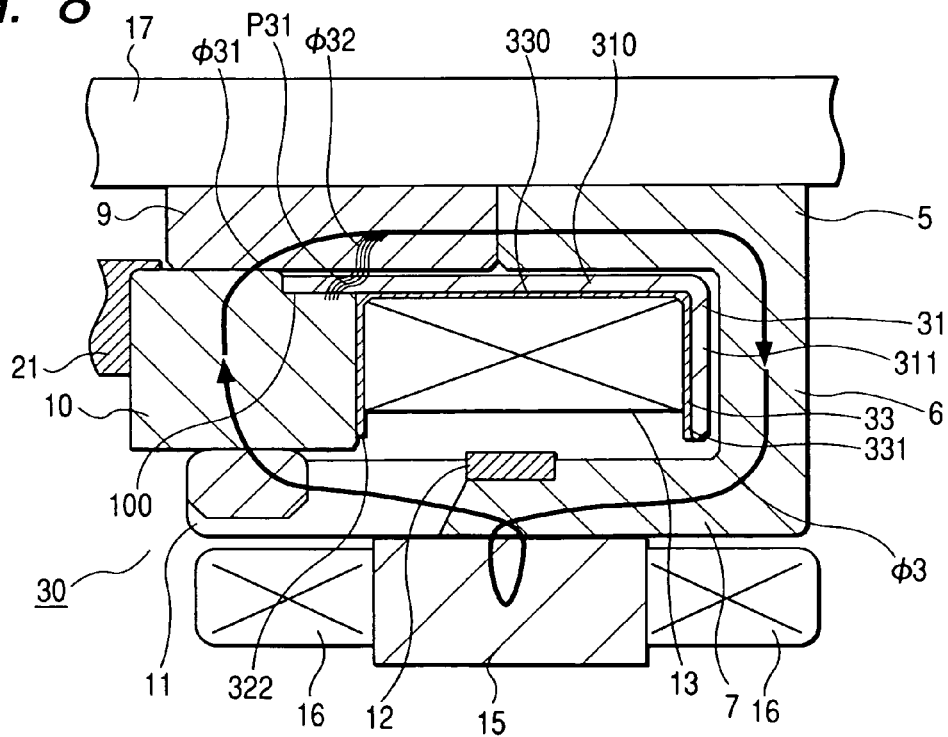
FIG. 8 is an axial sectional view of the bobbin provided in one embodiment of the present invention.

FIG. 8 is an axial sectional view of the parts around a bobbin provided in the brushless alternator in the embodiment 4 of the present invention. Referring to the drawing, the parts identical with those of the embodiments 1 to 3 will be designated by the same reference numerals, and a description thereof will be omitted.

As shown in FIG. 8, an insulating material made of an epoxy resin is applied to a radially outer surface of a cylindrical portion 310 of a plate 31, an end surface of a second yoke 10 and an inner surface of a flange 311 of the plate 31. When this structure is employed, the number of parts of the brushless alternator can be reduced, and the heat deterioration of the bobbin formed out of a nylon resin can be restrained. Moreover, the thickness of the insulating material applied to the mentioned surfaces can be minimized. The above enables the conductivity of the heat occurring in a field coil 13 to be improved, and a large space in which the field coil 13 is wound around the bobbin to be taken.

Embodiment 5

In this embodiment, a brushless alternator in which the shape of a cylindrical portion of a plate is changed will be described as an example of the brushless alternator according to the present invention.

Figure 9:
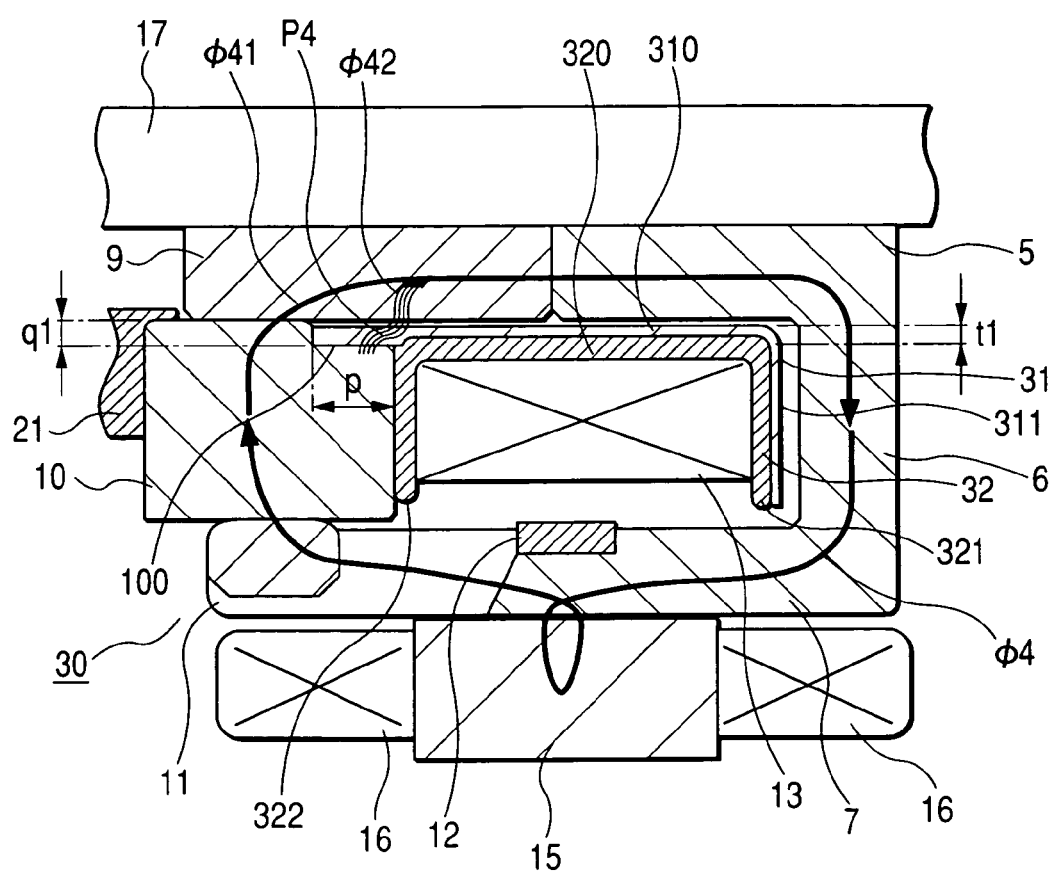
FIG. 9 is an axial sectional view of the bobbin provided in one embodiment of the present invention.

FIG. 9 is an axial sectional view showing parts around a bobbin provided in the brushless alternator in the embodiment 5 of the present invention. Referring to the drawing, the parts identical with those of the embodiments 1 to 4 will be designated by the same reference numerals and a description thereof will be omitted.

Referring to FIG. 9, a plate 31 is formed so that a part P4 of the plate 31 in which the choking of a magnetic flux $\phi 42$ occurs, i.e. only the part of a cylindrical portion 310 of the plate 31 that is fixed to a stepped portion 100 of a yoke is enlarged in diameter. When such a plate is used, the choking of the magnetic flux $\phi 42$ can be avoided, so that a value of a magnetic flux $\phi 4$ constituting a total magnetic flux can be improved.

What is claimed is:

1. A brushless alternator comprising:
   a rotor mounted on a shaft;
   a ring-shaped yoke which is fixed to an inner surface of a bracket supporting the shaft rotatably, and which is opposed to the rotor via a very narrow radial clearance;
   a stepped portion provided on a side surface of an inner circumference of an axial end section of the yoke;
   a plate fixed to the stepped portion and having a cylindrical portion made of a magnetic material;
   a bobbin provided so as to surround a radially outer side of the cylindrical portion of the plate for the purpose of winding a field coil therearound; and
   a stator provided with a clearance retained on an outer side of the rotor, to which stator a magnetic flux generated by the field coil is propagated, wherein
   a radial thickness of a part of the cylindrical portion of the plate which is fixed to the stepped portion provided on the inner circumferential surface of the yoke is set larger than 1 mm and not larger than 2 mm.

2. The brushless alternator according to claim 1 wherein the plate is provided with a flange at one axial end section of the cylindrical portion thereof.

3. The brushless alternator according to claim 2, wherein the bobbin is formed by applying an insulating material to a radially outer side of the cylindrical portion of the plate, an axial end surface of the yoke and an inner surface of the flange.

4. The brushless alternator according to claim 1, wherein the bobbin has a cylindrically formed portion, and at each end section of the cylindrically formed portion, a respective radially extending part is provided.

5. The brushless alternator according to claim 1, wherein the plate is fixed to the stepped portion by spot welding.

6. The brushless alternator according to claim 5, wherein an inner diameter of the portion of the yoke which is radially opposed to the rotor is set small so that a difference between the inner diameter of the rotor-opposed portion and that of the cylindrical portion of the plate becomes not smaller than 0.4 mm.

7. The brushless alternator according to claim 1, wherein the plate is fixed to the yoke by using a bonding agent.

8. The brushless alternator according to claim 1, wherein the plate is fixed to the yoke by engaging threaded portions provided on each of the plate and the yoke.

9. A brushless alternator according to claim 1, wherein the radial thickness of the cylindrical portion of the plate is set to 1.6 mm.

10. The brushless alternator according to claim 1, wherein the stepped portion has a first surface and a second surface that is substantially perpendicular to the first surface, and the plate is fixed to the stepped portion so as to contact both the first surface and the second surface.

11. The brushless alternator according to claim 1, wherein the bobbin is not fixed to the stepped portion.

* * * * *